Patented Feb. 10, 1942

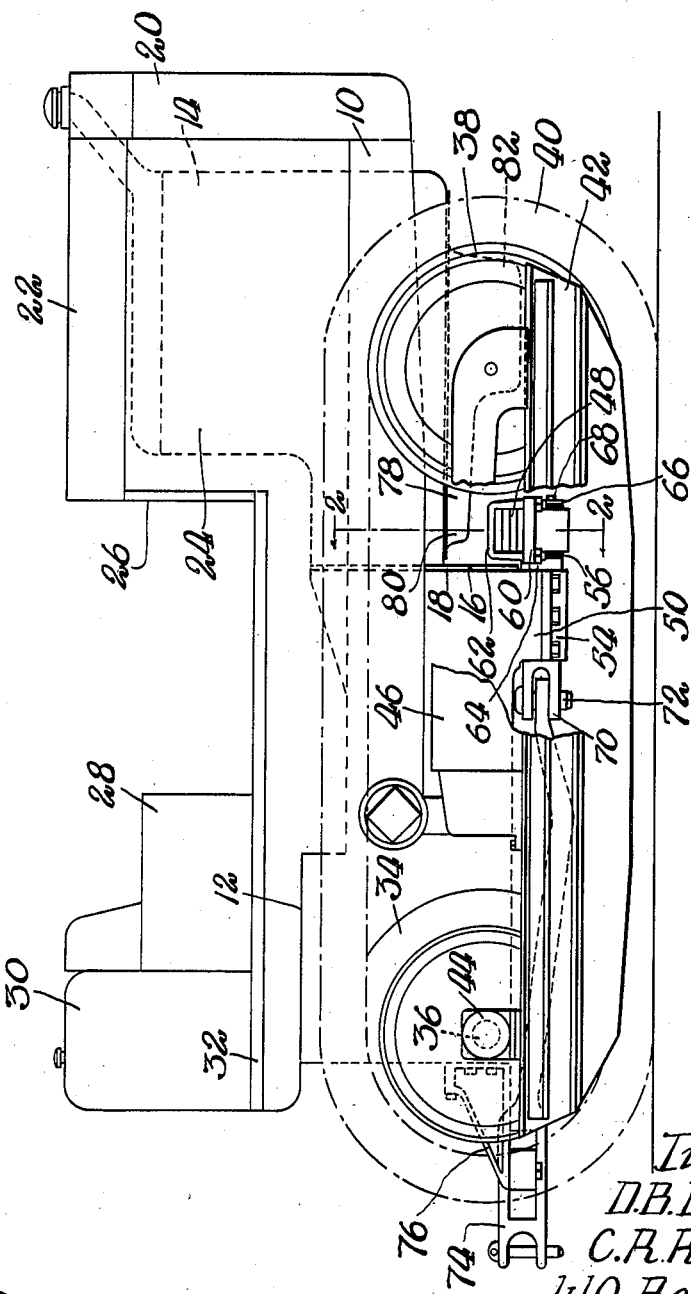

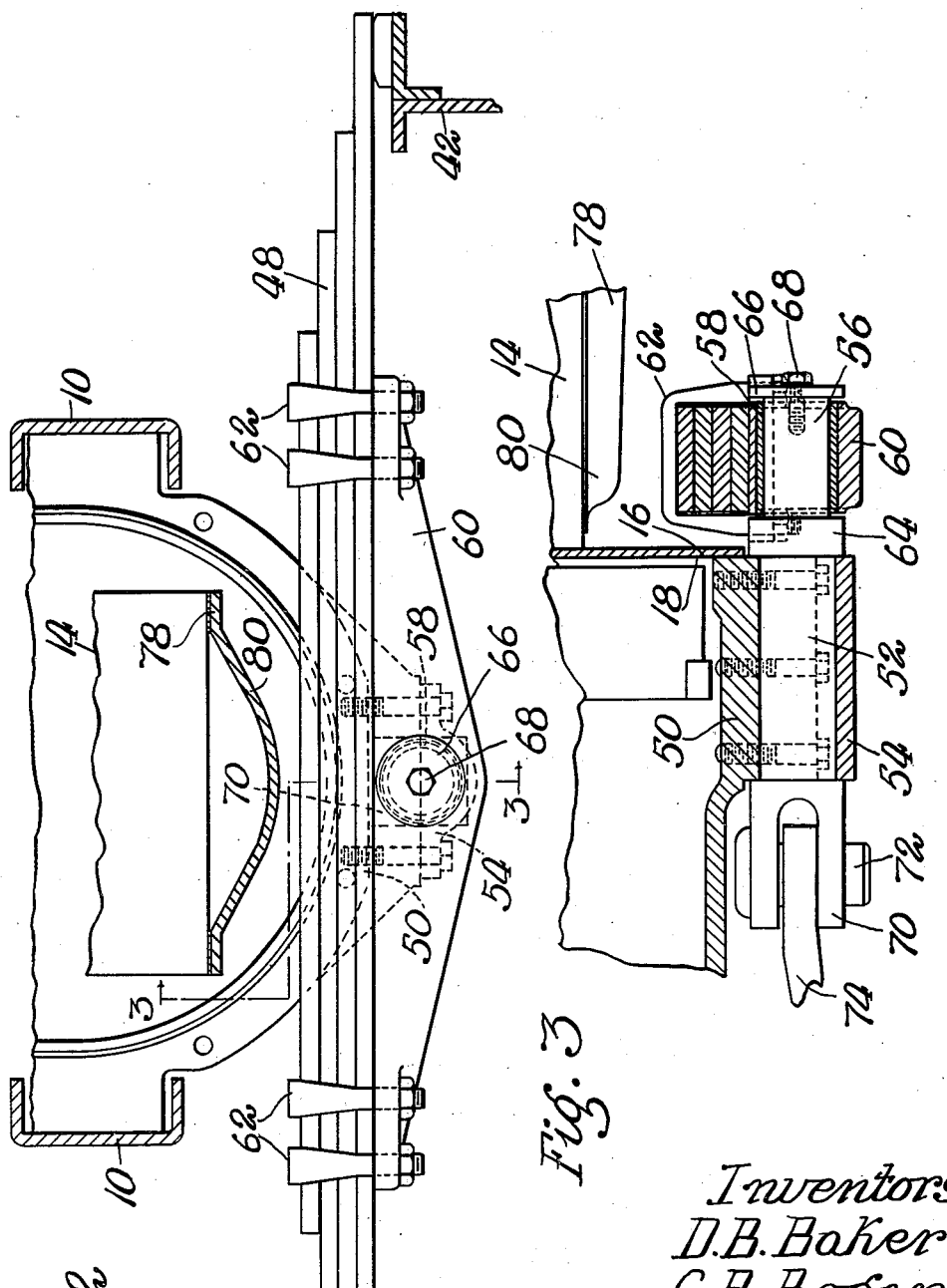

2,272,286

UNITED STATES PATENT OFFICE 2,272,286

TRACTOR

David B. Baker, Riverside, Clifford R. Rogers, Oak Park, and William O. Bechman, Chicago, Ill., assignors to International Harvester Company, a corporation of New Jersey Application March 2, 1939, Serial No. 259,406

21 Claims. (Cl. 180—9.1)

This invention relates to a crawler tractor and more particularly to an improved equalizer mounting and construction therefor.

The ordinary crawler tractor embodies a construction in which a longitudinal main frame is disposed between a pair of self-laying tracks, each of which includes a longitudinal side track frame pivotally associated at its rear with a rear portion of the main frame. The forward portion of the main frame, including the tractor body, is carried on a transverse equalizer in the form of a leaf spring which is supported intermediate its ends by the main frame and at its ends respectively by the side track frames.

In the design of a crawler tractor of the type above referred to, numerous problems are encountered which sometimes become apparent only when the tractor is operated under generally severe conditions. The construction provided by the present invention is directed mainly toward the elimination of such difficulties.

One feature in crawler tractor constructions that is almost universally adopted is the mounting of the equalizer spring intermediate its ends on the main frame, and in conjunction with pivotal mounting of the side track frames at their rear ends, the well known three-point suspension is provided. The present invention contemplates the improvement of such a construction with a view toward providing greater stability and a better distribution of weight of the tractor. As is well known to those skilled in the art, a considerable portion of the tractor body extends forwardly or overhangs the transverse equalizer, this characteristic being due, mainly, to the mounting of the engine at the forward end of the body. Various constructions have been tried and eliminated in which the equalizer spring was moved forwardly to eliminate some of this overhand, such constructions generally comprising a mounting means in which the equalizer was carried by a cast, or otherwise heavily reenforced, portion of the engine, an expensive crank pan serving as the support. Such constructions were undesirable because of the expense entailed in manufacture and because shocks from the track frames were transmitted to the engine. The greatest obstacle encountered in moving the equalizer spring forwardly without unduly increasing the height of the tractor, and thus raising its center of gravity, is the presence of the ordinary crank pan which must be made deep enough to compensate for rotation of the crank shaft of the engine and at the same time which must include a deeper portion in which the oil sump for the engine lubrication system is located.

Among the difficulties encountered in the operation of tractors embodying prior constructions characterized by poor and uneven weight distribution was that commonly known as "nosing down" of the forward end of the tractor during operation thereof over uneven terrain marked by the occurrence of ditches, sharply ascending obstacles, and the like. Considerable damage to the front end construction and radiator was experienced and the tractor operators were also endangered by the possibility of being thrown from their seats.

The principal object of the present invention is to provide an improved equalizer mounting for a crawler type tractor in which the equalizer is moved forwardly to provide for greater stability and better weight distribution of the tractor.

An important object is the provision of a crank pan for the engine in which the rear portion of the pan is shaped to provide clearance space in which the equalizer may be disposed.

Another important object is the provision of an equalizer mounting means in which the equalizer is mounted independently of the tractor engine.

Another object is to provide an improved construction in which the equalizer is mounted in the vicinity of the junction between a rear body part of the main frame and the forwardly mounted engine.

Another object is to provide an improved supporting means for the equalizer.

Another object is to provide the improved supporting means in a manner in which it serves also to have connected thereto the forward end of a rearwardly extending draft element.

Another object is to provide the improved supporting means in the form of a longitudinally extending member which is removably carried by the tractor body and from which the equalizer spring may be readily removed.

Still another object is to provide the removable member and its relation with respect to the equalizer and the body in a manner permitting removal of the member from the body and from the equalizer without materially disturbing the relative position between the body and the equalizer.

And, still another object is to provide the improved supporting means in a manner minimizing the transmission of shocks between the draft element and the equalizer.

And, still another object is to provide a supporting member, the position of which may be changed to compensate for wear thereof.

Briefly, these and other desirable objects of the invention are achieved in one preferred form of construction in which the tractor main frame includes a rear body part joined at its forward end to the rear end of a forwardly mounted engine. The body carries therebelow at its forward end a longitudinally extending pivot member, a forward part of which projects below the engine and has pivotally carried thereon the intermediate portion of a transverse equalizer which has its opposite ends associated respectively with the side track frames of the tractor. The engine crank pan is made shallow at its rear end to provide clearance space in which the equalizer may have vertical movement as the track frames oscillate during operation of the tractor. The clearance space serves also to permit ready removal of the equalizer from the pivot member. The rear end of the pivot member is formed as a clevis and has connected thereto the forward end of a rearwardly extending draft element or drawbar; and the member is further provided with means in the form of a shoulder engaging the body for the purpose of minimizing the transmission of shocks between the drawbar and the equalizer.

A more complete understanding of the objects and desirable features of the invention may be had from the following detailed description taken in conjunction with the accompanying drawings, which illustrate and pertain to a preferred form of construction.

In the drawings:

Figure 1 is a side elevational view of a crawler tractor, partly in section, illustrating the improved equalizer mounting;

Figure 2 is an enlarged, transverse sectional view taken substantially along the line 2—2 of Figure 1; and Figure 3 is a longitudinal sectional view taken substantially along the line 3—3 of Figure 2.

The crawler tractor chosen for the purposes of illustration includes a longitudinal main frame comprising a pair of side sills 10 between which are disposed a rear body part 12 and a forwardly mounted engine 14. The forward end of the rear body part is enlarged to provide the usual clutch and fly-wheel compartment, and at its front face 16 is secured to a rear face 18 of the engine 14, both the body and the engine being rigidly secured to the opposite side sills 10. A conventional radiator 20 is disposed ahead of the engine 14 and the engine is enclosed by a hood 22 including side sheets 24 secured to a transverse dash panel 26 ahead of an operator's compartment in which is located an operator's seat 28. A fuel tank 30 is disposed behind the seat 28 and the operator's platform is delineated at each side by a pair of longitudinally running fenders 32, only one of which is shown.

The rear body part 12 includes the usual transmission and driving mechanism for a pair of track chain devices disposed, respectively, at each side of the main frame, each including a drive sprocket 34 carried on a transverse rear axle 36 and a front idler 38 about which an endless self-laying track chain 40 is arranged. Each track device includes a side track frame 42 which consists of longitudinally extending channel members, one of which is connected at its rear end to the outer end of the transverse axle 36 through the medium of a bracket or support 44. The forward end of each track frame slidably carries the idler wheel 38 which in turn is controlled by the usual recoil spring assembly enclosed within a housing 46, only part of which is shown, carried intermediate the ends of the track frame.

The rear body part is provided at its underside with the improved mounting means for an equalizer 48 in the form of a transverse leaf spring having its opposite ends resting respectively on or otherwise associated with the track frames 42, the relation between only one track frame and only one end of the equalizer 48 being illustrated, since both sides of the tractor are identical. The body part is provided at its underside with a mounting pad 50 which is formed with a longitudinally extending semi-cylindrical recess or groove in which is mounted an equalizer supporting member 52 in the form of a cylinder shaft or pin, a complementary cap 54 being provided with a semi-cylindrical recess or groove and fitting over the pin or shaft 52 for securing the same to the mounting pad 50. The relation between the parts 50, 52 and 54 is best shown in Figure 3.

The member 52 is carried by the main frame substantially at the junction between the rear body part 12 and the engine 14, and includes a forwardly extending pivot part 56, having a free end which projects below the engine 14, provided with an annular bushing 58 on which is pivotally carried a transverse mounting bracket 60 to which the equalizer spring 48 is secured through the medium of a plurality of U-bolts 62. The member 52 is formed with an annular shoulder 64 between the member part 56 and the member part carried by the body 12, the purpose of which will appear later. The equalizer mounting bracket 60 is carried by the pivot part 56 of the member 52 for removal therefrom in a direction longitudinally of the tractor, and the entire equalizer together with the bracket 60 may be removed longitudinally from the member 52 without materially disturbing the relative position between the member and the rear body part. In order to attain the aforesaid object, a plate or washer 66 is secured by a bolt or cap screw 68 to the forward end of the pivot part 56 of the member, the diameter of the plate 66 being greater than the diameter of the bushing 58 and large enough to engage the equalizer bracket 60. The equalizer 48 is thus limited against fore and aft movement between the shoulder 64 and the plate 66.

The other end of the member 52 extends rearwardly and longitudinally beyond the mounting pad 50 and cap 54 and is shaped to form a clevis 70 to which is connected, by a suitable pin 72, the forward end of a draft element or drawbar 74. The drawbar 74 extends rearwardly below the transverse axle 36 and is suitably mounted for lateral movement on a drawbar supporting structure 76 carried at the rear end of the rear body part 12, the drawbar being guided by the supporting structure and pivoting about the pin 72. Since the shoulder 64 formed on the member 52 abuts the mounting pad 50 and cap 54, shocks and stressses caused by draft on the drawbar 74 are not transmitted to the equalizer, the shoulder 64 providing means for confining the transmission of such shocks directly to the main frame of the tractor.

An important feature of the invention is the provision of a crank pan 78 carried by and below the engine 12, the pan being shallow at its rearward end as at 80 in the vicinity of the equalizer spring 48, being so shaped to provide clearance space above and ahead of the equalizer, within which space the equalizer may have vertical pivotal movement about the member 52 as the track frames 42 oscillate during operation of the tractor. The crank pan 78 is specially provided to compensate for the particular location of the equalizer 48 as provided by the present invention, and is made deep enough to accommodate rotation of the engine crank shaft, being made deeper at its forward end, as at 82, to accommodate the usual oil sump comprising part of the engine lubricating system. The particular shape of the crank pan 78 also permits the longitudinal removal of the equalizer 48 from the member 52 which is accomplished by removing the cap screw 68 holding the plate 66 on the member pivot part 56.

From the foregoing description, it will be seen that an improved equalizer mounting means has been provided for a crawler tractor, which means incorporates the desirable features of simplicity and strength and easy installation and removal of the various component parts thereof. A highly desirable feature of the construction is that which permits the location of the equalizer spring at a position a considerable distance ahead of the positions common to prior constructions. This desirable location has been achieved without sacrificing other features of the tractor construction and the utilization of the particular crank pan in conjunction with the location is a significant part of the present invention as embodied in the preferred form illustrated and described herein. The location of the equalizer farther forwardly than in prior constructions eliminates the transverse tunnel commonly provided in the main frame for accommodating the equalizer, the provision of such a tunnel entailing considerable expense because complicated casting procedure had necessarily to be resorted to. The utilization of the supporting member 52 as a connection for the drawbar 74 also eliminates a casting and machining operation ordinarily necessary to provide mounting means for the draw-bar. Above all, however, is the primary feature of the location of the equalizer to give the tractor greater stability and to attain better weight distribution.

While only a preferred form of the invention has been illustrated and described, it will be understood that numerous modifications and alterations may be made therein without departing from the spirit and scope of the appended claims.

What is claimed is:

1. In a crawler tractor having a main frame disposed between a pair of side track frames, said main frame including a forwardly disposed engine having a removable crank pan, said crank pan having a deep forward portion and a shallow rear portion, and a transverse equalizer carried by the main frame beneath the shallow rear portion of the crank pan and independently thereof, opposite ends of the equalizer being connected respectively with the track frames.

2. In a crawler tractor having a main frame disposed between a pair of side track frames, said main frame including a rear body part and a forwardly disposed engine, a crank pan removably carried by and beneath the engine and having a deep forward portion and a shallow rear portion at the rear end of the engine, and a transverse equalizer carried by the main frame forwardly of the rear end of the engine and below the crank pan shallow part and independently thereof, opposite ends of the equalizer being connected respectively with the track frames.

3. In a crawler tractor having a main frame disposed between a pair of side track frames, said main frame including a rear body part and a forwardly disposed engine, a crank pan carried by and below the engine and having a shallow rear portion, a support carried by the rear body and extending forwardly below the crank pan shallow portion, and a transverse equalizer carried intermediate its ends by the support and having its opposite ends resting respectively on the track frames.

4. In a crawler tractor having a main frame disposed between a pair of side track frames, said main frame including a rear body part and a forwardly disposed engine, a crank pan carried by and below the engine and having a shallow rear portion, a support removably carried by the rear body and having a portion extending forwardly below the crank pan shallow portion and a portion extending rearwardly, a transverse equalizer carried intermediate its ends on the forward portion of the support and having its opposite ends connected respectively with the track frames, and a draft element connected to the rearward portion of the support.

5. In a crawler tractor having a main frame disposed between a pair of side track frames, a longitudinal pivot member carried by and below the main frame, a transverse equalizer pivoted intermediate its ends on the pivot member and having its opposite ends connected respectively with the track frames, and a rearwardly extending draft element connected to the pivot member.

6. In a crawler tractor having a main frame disposed between a pair of side track frames, said main frame including a rear body part and a forwardly disposed engine, the forward end of the body part being secured to the rear end of the engine, a longitudinal pivot member carried by and below the main frame and extending forwardly of the junction between the body and engine, a transverse equalizer pivoted intermediate its ends on the pivot member and having opposite ends connected respectively with the track frame, and a rearwardly extending draft element connected to the pivot member rearwardly of the equalizer.

7. In a crawler tractor having a main frame disposed between a pair of side track frames, said main frame including a rear body part and a forwardly disposed engine, the forward end of the body part being secured to the rear end of the engine, a support carried by and below the main frame and extending forwardly of the junction between the body and engine, and a transverse equalizer carried intermediate its ends on the support and having opposite ends connected respectively with the track frames.

8. In a crawler tractor having a rear body and a forwardly disposed engine carried between a pair of opposite track frames, a removable support carried by the body and including a part extending forwardly below the engine, a crank pan carried by the engine and formed at its rearward portion to provide clearance space between the lower part of the engine and the forward part of the support, and a transverse equalizer carried by the forward part of the support in said clearance space and having its opposite ends connected respectively with the track frames.

9. In a crawler tractor having a rear body and a forwardly disposed engine carried between a pair of opposite track frames, a removable support carried by the body and including a part extending forwardly below the engine, a crank pan carried by the engine and formed at its rearward portion to provide longitudinal clearance space between the lower part of the engine and the forward part of the support, and a transverse equalizer removably carried by the forward part of the support in said clearance space and having its opposite ends connected respectively with the track frames, said equalizer being removable longitudinally from the support in said clearance space.

10. In a crawler tractor having a rear body and a forwardly disposed engine carried between a pair of opposite track frames, a longitudinal member carried by the body and removable rearwardly therefrom, said member extending forwardly below the engine, a transverse equalizer removably carried intermediate its ends by the member and removable forwardly therefrom and having its opposite ends connected respectively with the track frames, the member being removable rearwardly from the body and the equalizer independently of the removal of the equalizer from its position relative to the body and track frames.

11. In a crawler tractor having a rear body and a forwardly disposed engine carried between a pair of opposite track frames, a mounting pad formed at the underside of the body at its forward end, a member mounted on said pad and including a clevis part and a pivot part, said pivot part extending forwardly below the engine, a transverse equalizer carried on the pivot part and connected with the track frames, and a draw-bar connected to the clevis.

12. In a crawler tractor having a main frame carried between a pair of side track frames and including a forwardly mounted engine, a support carried solely by the main frame and extending underneath the engine and separate therefrom to eliminate transmission of forces and the like from the support to the engine, and a transverse equalizer carried by the support below the engine and connected with the track frames.

13. In a crawler tractor having a main frame carried between a pair of side track frames and including a forwardly mounted engine, a support carried by the main frame and including a member extending forwardly below the engine and a removable cap for securing the member to the main frame, a rearwardly extending draw-bar connected to the member, a transverse equalizer carried by the member below the engine and connected with the track frames, and means between the member and the main frame for holding said member against longitudinal rearward movement with respect to the main frame caused by draft on the draw-bar.

14. In a crawler tractor having a rear main frame disposed between a pair of track frames and including a forwardly mounted engine and crank case structure, a longitudinal support carried by the rear main frame and extending forwardly beneath and independently of the engine and crank case structure, and a transverse equalizer pivotally connected to the support between its ends and connected with the track frames, whereby transmission of forces and the like from the equalizer is confined through the support to the rear main frame.

15. In a crawler tractor having a rear body and a forwardly disposed engine carried between a pair of opposite track frames, a support on the body extending underneath the engine, a removable crank pan carried beneath the engine and shaped to provide clearance space in the vicinity of the support, and a transverse equalizer movably carried by the support beneath the engine independently of the crank pan and connected with the track frames and movable in the aforesaid clearance space.

16. In a crawler tractor having a main frame carried between a pair of side track frames and including a rear frame part and forwardly mounted engine, an equalizer carried beneath the main frame and connected with the track frames, and a removable crank pan carried by and below the engine independently of the rear frame part and having a deeper portion forwardly of the equalizer and a shallow rear portion in the immediate vicinity of the equalizer.

17. In a crawler tractor, a longitudinal body, opposite side track frames to support the weight of the body, said body carrying a unitary member therebelow including vertical and horizontal pivot members, a draw-bar connected to the vertical pivot member, and an equalizer connected to the horizontal pivot member and connected with the track frames.

18. In a crawler tractor having a main frame disposed between a pair of side track frames, a transverse equalizer below the main frame and connected at opposite ends respectively with the track frames for supporting the main frame, a draw-bar, and a bracket member serving as a common attaching means for connecting the draw-bar and equalizer to the body, said bracket including means for preventing transmission of draw-bar shock to the equalizer.

19. In a crawler tractor having a main frame carried between a pair of side track frames, a support carried by the main frame and including a longitudinally extending cylindrical bearing portion, a removable cap for rigidly securing the member to the frame with the cylindrical portion extending away from the cap, and a transverse equalizer movably carried by the cylindrical portion of the member, said member being positionable about its longitudinal axis with respect to the frame and equalizer to compensate for wear of the cylindrical portion as caused by the equalizer.

20. In a crawler tractor having a rear body and a forwardly disposed engine carried between a pair of opposite track frames, a forward part of the body depending below a rearward part of the engine, a support on said forward part of the body extending forwardly underneath said rearward part of the engine and separate therefrom, and a transverse equalizer carried by the support below said rearward part of the engine and connected with the track frames.

21. In a crawler tractor having a main frame disposed between a pair of side track frames, said main frame including a rear body part and a forwardly disposed engine, a supporting structure supported solely by the main frame and having a free end portion extending longitudinally of the frame and separate from the engine, and a transverse equalizer carried by the free end of the supporting structure and having its opposite ends connected respectively with the track frames whereby transmission of forces and the like from the equalizer to the engine is prevented.

DAVID B. BAKER.
CLIFFORD R. ROGERS.
WILLIAM O. BECHMAN.